United States Patent
Hadfield et al.

(10) Patent No.: US 7,401,704 B2
(45) Date of Patent: Jul. 22, 2008

(54) CONVEYOR APPARATUS

(75) Inventors: David Hadfield, Rudgwich (GB); Michael Hess, Newbury (GB); Alastair Sinker, Winchester (GB); Ian Smyth, Easton Winchester (GB); Pete Thompson, Gloucester (GB)

(73) Assignee: Cyclotech Limited, Basingstoke, Hampshire (GB)

( * ) Notice: Subject to any disclaimer, the term of this patent is extended or adjusted under 35 U.S.C. 154(b) by 120 days.

(21) Appl. No.: 11/178,229

(22) Filed: Jul. 8, 2005

(65) Prior Publication Data

US 2006/0006126 A1    Jan. 12, 2006

(30) Foreign Application Priority Data

Jul. 10, 2004    (GB) ................... 0415521.4

(51) Int. Cl.
    *B01D 21/24*    (2006.01)
(52) U.S. Cl. .................. 210/521; 210/523; 210/524; 210/532.1; 96/182
(58) Field of Classification Search ............... 210/521, 210/523, 524, 532.1; 96/182, 183, 184
    See application file for complete search history.

(56) References Cited

U.S. PATENT DOCUMENTS

| | | | | |
|---|---|---|---|---|
| 2,267,608 A * | 12/1941 | Hawley | ...................... | 210/523 |
| 2,973,866 A * | 3/1961 | Genter et al. | ............... | 210/524 |
| 3,013,395 A * | 12/1961 | Gaylord | ................... | 210/532.1 |
| 3,788,981 A * | 1/1974 | Richard et al. | .............. | 210/521 |
| 4,042,512 A * | 8/1977 | McCarthy et al. | ........... | 210/521 |
| 4,067,813 A * | 1/1978 | Pielkenrood | ................. | 210/521 |
| 4,514,303 A * | 4/1985 | Moore | ........................ | 210/521 |
| 4,913,819 A * | 4/1990 | Patterson | .................... | 210/523 |
| 6,491,830 B1 * | 12/2002 | Batten et al. | ................. | 210/521 |
| 6,537,458 B1 * | 3/2003 | Polderman | .................... | 96/184 |
| 7,144,516 B2 * | 12/2006 | Smith | ........................ | 210/523 |
| 2004/0222170 A1 * | 11/2004 | Hauge et al. | ................. | 210/523 |

* cited by examiner

*Primary Examiner*—Christopher Upton
(74) *Attorney, Agent, or Firm*—Sheridan Ross P.C.

(57) ABSTRACT

A conveyor apparatus for conveying solid material in a process vessel includes, a first baffle set comprising a plurality of inclined baffles located above the eductors and arranged to restrict upward flow of solids in the direction of movement of the solids. A second baffle set may be used to prevent particles rebounding from an end wall and back into upper levels of the vessel.

40 Claims, 6 Drawing Sheets

CONVEYOR APPARATUS

This invention relates to conveyor apparatus and particularly though not exclusively to conveyor apparatus for conveying solid material such as sand, from a process vessel.

Most oil and gas producing wells, whether onshore or offshore, produce oil, gas, water and solids. The role of an offshore or an onshore production facility is to separate these four phases and route only the hydrocarbon streams to export. It will be appreciated that often in practice, the associated gas is reinjected or flared and the water is treated i.e. solids and oil are removed, and either disposed of overboard or reinjected back into the periphery of the oil or gas reservoir or into a separate aquifer.

Solids often appear as sand, clay or silt. These solids generally originate from the reservoir, but other solids may also be produced such as corrosion by-products from the well tubing and process equipment or frac sand which has been deliberately injected downhole to increase the permeability of the reservoir. The amount, type, size and production variability of the solids produced varies widely from field to field.

Solids production rates do not have to be particularly high before they begin to affect processing of the well output. For example, solids cause particular problems with process vessels such as gravity separators since the solids settle out in these vessels due to the quiescent environment within the vessels. Typically, as the solids accumulate, the residence times for the liquid phase(s) decline for a given liquid throughput and therefore separation performance is impaired. The solids accumulation in these vessels also forms a good breeding ground for bacterial growth which can cause severe corrosion of the vessel walls.

Erosion damage to pipework and valves as a result of sand production is common, particularly in high pressure production, and solids can block and disrupt instrumentation such as in line flowmeters and pressure indicators.

Several approaches have been made in the prior art in order to overcome the problem of solids accumulation in process vessels. U.S. Pat. No. 5,612,003 is not directly concerned with the removal of solids from a vessel but shows the simple use of a single eductor to maintain a fluidised bed of particulate matter (for example a catalyst fuel or a reactant). The output of the eductor is fed into the inlet of a cyclone which separates particulate matter and returns it to the fluidised bed.

U.S. Pat. No. 3,895,927 again discloses the use of a single eductor (described as a "dual ejector"). The "dual" function of the ejector refers to the use of the ejector both to move mud or solids in a process vessel and also to draw a vacuum on the vessel. Thus this document is concerned with avoiding the use of a separate vacuum pump and the associated piping requirements.

EP-A1-0792950 discloses the use of a plurality of eductors operating independently of one another to discharge solids settled in a vessel having an inclined bottom surface. The vessel is used for decontamination or electroplating of metallic articles. The eductors are used to prevent "sludge" or other solid particles from piling up in the vessel. The eductors (described as "ejectors") are used to move solids to a predetermined place at one side of the vessel.

U.S. Pat. No. 4,428,841 discloses a housing with multiple eductors which are used for solids cleaning and removal. The eductors are used periodically to agitate a "corrugated plate arrangement" which is used in "solids cleaning".

WO 00/25886 discloses the use of daisy-chained eductors to move solids along a process vessel to a solids outlet.

In accordance with a first aspect of the invention there is provided a process vessel for separating products from oil or gas wells, having a solids outlet, and a plurality of eductors positioned within and generally at the bottom of the vessel and arranged in use to move solids generally along the bottom of the vessel towards the solids outlet, the vessel including a first guide means located above the eductors and arranged to restrict upward flow of solids.

Optionally, the vessel includes a second guide means located above and/or adjacent the first guide means. This may be arranged to restrict upward flow of solids reflected from the end wall of the vessel or a weir in the vessel.

The invention also provides in another aspect, guide means for a process vessel comprising a generally flat or curved sheet mountable in a process vessel and including apertures arranged to permit the passage of process solids.

In a method aspect, there is provided a method of improving separation of solids in a flowing liquid-solid mix comprising providing a generally planar guide with apertures whereby solids particles are able to pass through the apertures during their downward trajectory but are generally unable to pass back upwardly.

Embodiments of process vessels in accordance with the invention will now be described, by way of example, with reference to the drawings in which.

Figure 1:
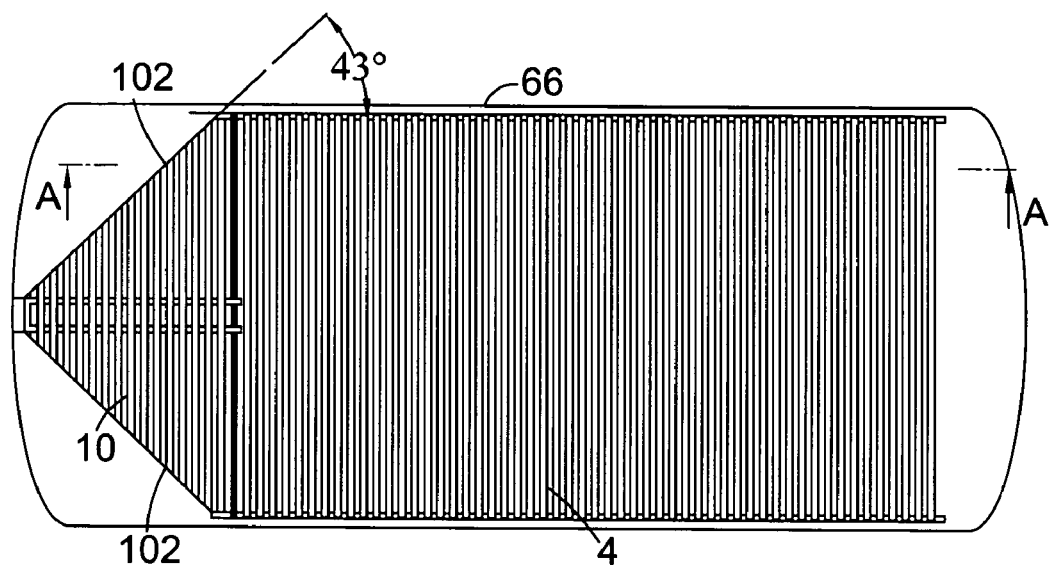
FIG. 1 is a plan view of a vessel in accordance with the invention.
Figure 2:
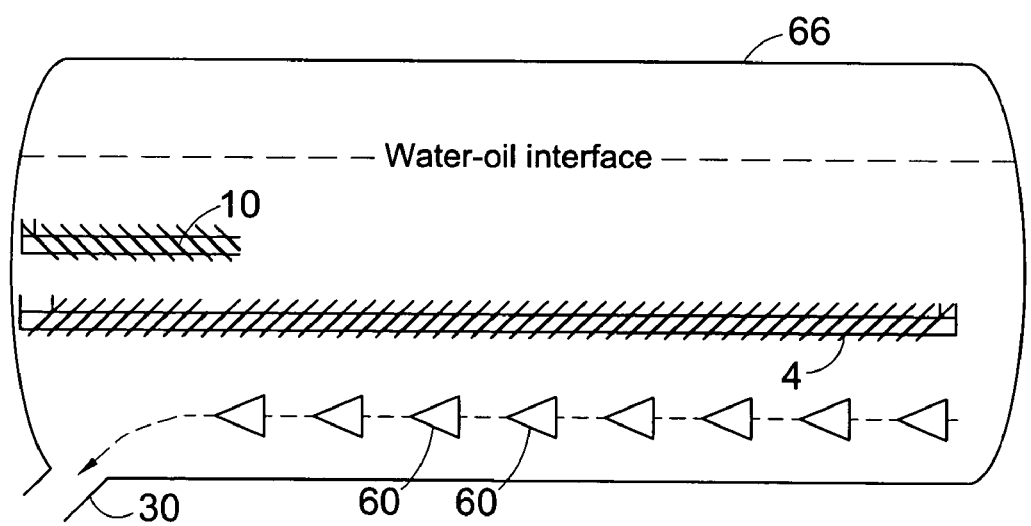
FIG. 2 is a section along line A-A of FIG. 1.
Figure 13:
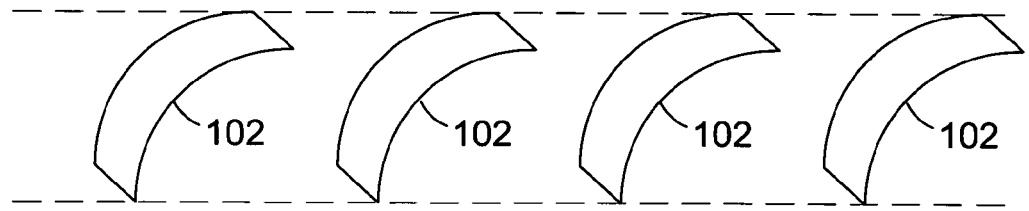
Figure 14:
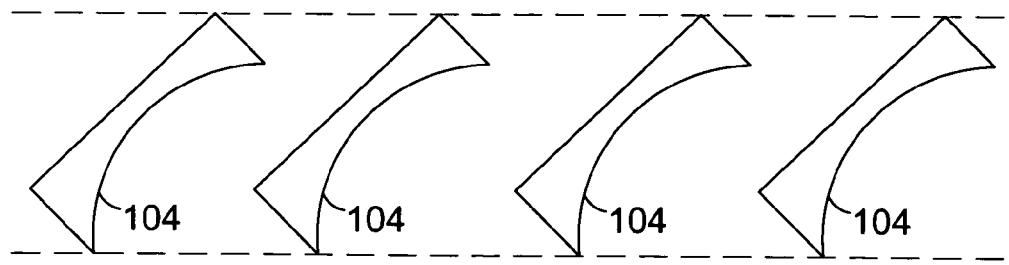

FIG. 13 is a sectional view of one possible configuration for baffles in accordance with the invention; and FIG. 14 is a sectional view of another possible configuration for baffles in accordance with the invention; and With reference to FIGS. 1 and 2, a vessel 66 has a plurality of eductors 60 which are described in more detail below, located generally at the bottom of the vessel 66. The vessel also has a solids outlet 30 to which the eductors 60 direct solids which have settled out of the process liquids in the vessel 66.

Process liquids such as oil and water are fed into the vessel 66 and travel generally from right to left in the Figure. As the liquid travels, solids tend to settle out as indicated by dotted line 2 in FIG. 2A. Once settled, they are entrained in a flow created by the eductors 60 as described below.

However, some solids have a tendency to be released from the flow and can move upwardly into the higher regions of the vessel 66. This is generally undesirable. In order to mitigate this problem, guide means 4, in this example in the form of a first louvered plate 4 comprising a plurality of baffles 6, is located above the eductors.

Figure 2A:
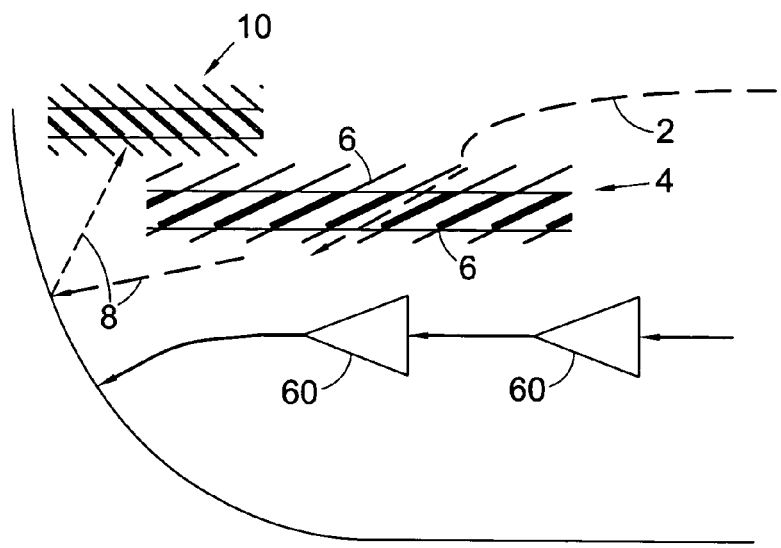
FIG. 2A is an enlarged view of the vessel of FIG. 2 adjacent the solids outlet.

The baffles are inclined so that the trajectory of solids particles 2 passes generally parallel to the plane of the baffles 6 as shown in detail in FIG. 2A.

In this way, settlement of the solids particles is barely disrupted. However, solids particles attempting to return to the upper levels of the vessel 66 are generally blocked by the baffles 6 unless by chance they happen to take an upward path which passes through the baffles without making contact. It will therefore be appreciated that only a very low proportion of particles is able to pass back through the louvered plate 4.

The guide means 4 may instead be formed from a perforated plate, for example, which may also have corrugations arranged to help fluid flow and solids settling. The plate may have indentations which desirably may have apertures near or at the lower parts of the recesses. The recesses may be generally randomly distributed and/or periodically distributed across the plate.

Typically, the plate 4, is sealed against the wall of the vessel 66 to ensure that solids particles do not escape past the plate.

The inclination of the baffles 6 is generally of the order of 40 degrees to horizontal. Ideal ranges are between 30 and 50 degrees with a range between 35 and 40 degrees being most preferred. The precise angle will depend on the flow velocity through the vessel 66 and the relative mass of particles and viscosity of the process liquid. Generally, the limiting angle of repose of sand on steel is about 35 degrees to horizontal. Thus since it is not desired to have solids (often predominantly sand) resting on the plate 4, the angle is typically kept steeper than 35 degrees. The variability of some of these factors also has an influence on the lateral spacing of the baffles. Wider spaced baffles 6 can accommodate a larger variation in trajectory of solids particles but wider spacing also provides greater opportunity for particles to return to the upper levels of the vessel 66.

As the solids approach the end of the vessel 66, there is a possibility that some particles will rebound from the end wall of the vessel as shown by dotted line 8 in FIG. 2A. In order to prevent this opportunity for particles to reach the upper levels of the vessel 66, a second guide means having a structure which may be similar to that of the first guide means, such as a louvered plate 10 is located preferably above the first, and with baffles inclined generally in the opposite direction to those of the first plate 4. It will be seen that this second plate 10 substantially prevents such reflected particles from escaping. Such particles then fall back down towards the bottom of the vessel and are ejected through the solids outlet 30.

Generally, it is desirable to have the first and second guide means located in areas of high sand velocity or momentum. It has been found that if sand velocity drops, there is a tendency for the sand not to be caught by the guide means and instead to be moved by currents such as eddy currents.

Thus the first guide means ideally should be as low in the vessel 66 as possible and the second guide means typically will be a similar distance above the second guide means as the first guide means is above the bottom of the vessel.

Alternative configurations are described below.

For completeness, the operation of the eductors will now be described. However, it should be noted that the louvered plate approach described above is applicable to any process vessel in which solids are moved along the bottom of a process vessel by some motive means and in which it is undesirable for the solids to re-mix with other liquids in the vessel. Eductors are not therefore essential.

Figure 3:
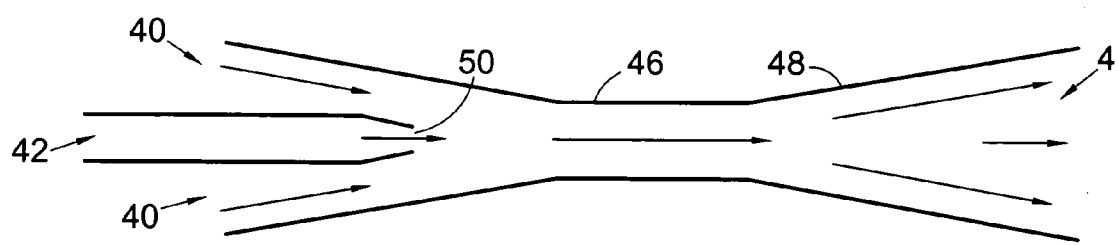
FIG. 3 is a schematic sectional view of a typical eductor.

With reference to FIG. 3, a typical eductor has a solids inlet 40, a jet inlet 42 and an outlet 44.

The eductor acts as a jet pump which uses some of the energy from a motive fluid entering the jet inlet 42, to entrain another fluid in order to eject it at a higher pressure than that at which it entered the solids inlet 40.

In the case described below, the motive fluid is water which is directed into a convergent section 46 of the eductor. The motive fluid may, for example, be seawater, produced water (produced from the well) or hydrocarbon.

The motive fluid entrains the fluid in which the eductor is submerged and as the entrained fluid enters a divergent section 48, some of the kinetic energy of the motive fluid is converted into pressure energy in the diffuser section. This causes the mixture of motive fluid and fluid entering the solids inlet 40 to be discharged at a higher pressure than the eductor suction pressure present at the solids inlet 40.

Thus, the eductor shown actively draws fluid from behind the nozzle 50 of the jet inlet 42 and ejects it out of the divergent section 48. A solids inlet may instead or in addition be provided at the convergent section 46; this latter arrangement being particularly useful for the transverse eductors described below.

Eductors are also known as jet pumps and ejectors. The general principle is that all these devices enable energy from a high pressure source to be used to boost the pressure of low pressure fluids. An eductor therefore has at least the following two main benefits:

1. It allows low pressure fluids to flow at lower pressure without being exposed directly to the high pressure source.
2. The pressure of the low pressure fluids is increased through the eductor which helps in their transportation or allows a required downstream operating pressure to be met.

Motive and suction flows may be gas or liquid phase or a mixture of the two. The choice affects the eductor performance.

The characteristic of increased pressure through the eductor means that eductors may be "daisy-chained", i.e. the output of one eductor provides the input for the next eductor in the chain. This is possible because the solids in the fluid passing through the eductor are both drawn and driven rather than just being driven as in a conventional jetting nozzle.

Figure 4:
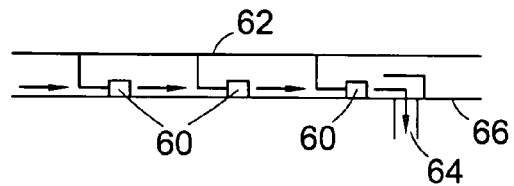
FIG. 4 is an enlarged schematic sectional view of the bottom part of a process vessel containing conveyor apparatus.

FIG. 4 shows daisy-chained eductors 60 fed from a jet water manifold 62 and arranged to eject solids entrained in a fluid through a solids discharge port 64. By careful selection of the size of the eductors and balancing of the flow rates and velocities, a highly efficient solids transport system can be created where flow vectors are restricted to the area of the eductors. To achieve this, flow continuity from one eductor to the next should preferably be maintained. Thus, the total flow output (motive fluid and eductor suction fluid) from all upstream eductors feeding a downstream eductor should ideally equal the suction fluid inlet flow of that downstream eductor.

Figure 6:
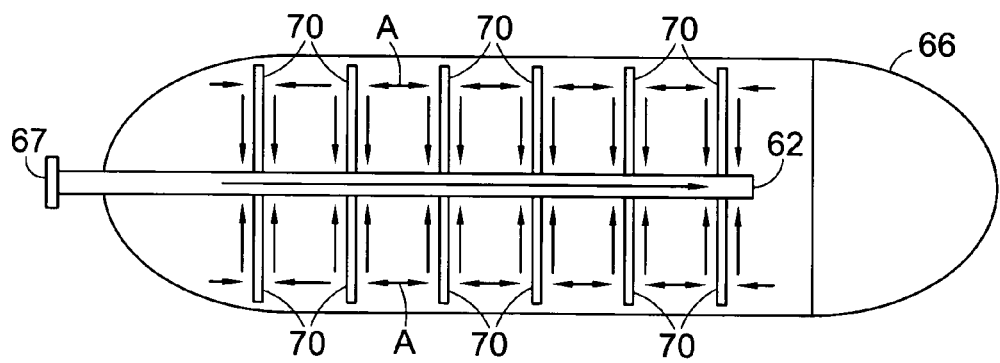
FIG. 6 is a schematic plan view of a process vessel containing conveyor apparatus.
Figure 7:
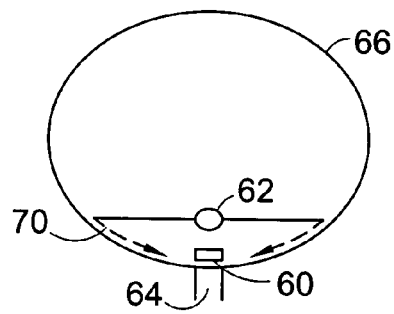
FIG. 7 is a schematic sectional view of the process vessel of FIG. 6.

By locating daisy-chained eductors generally at the bottom of a separator housing 66 as shown in FIGS. 6 and 7, a solids jetting flow which is highly localized may be created at the bottom of the vessel. This ensures minimum disturbance to the separator's bulk flow in the upper regions of the housing 66. The housing 66 has an inlet 67 for the jet water manifold 62.

In a preferred embodiment, not only does the housing 66 have daisy-chained eductors located at its bottom but also a second set of eductors 70 located along the housing side wall transversely of the daisy-chained eductors 60. This second set of transverse eductors 70 fluidize the side wall region and direct the solids to the bottom of the housing. The axial eductors 60 transport the solids along the bottom in the direction of the bulk fluid flow in the vessels, to the solids discharge port 64.

Figure 5:
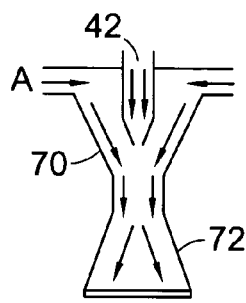
FIG. 5 is a schematic sectional view of a transverse eductor.

The transverse eductors 70 draw their source generally horizontally from either side along the side wall as shown by arrows A in FIGS. 5 and 6 and eject the flow to form a high velocity expanding "sheet" preferably achieved by the diffuser section 72 having a high cross-sectional aspect ratio (and arranging for the longer side to be parallel to the side wall).

The outlet of the transverse eductors 70 is drawn by the axial eductors 60 through about 90° and is then transported axially along the bottom of the housing 66 by the axial eductors 60 to the nearest solids outlet 64.

It will be appreciated that the transverse eductors may be inclined so that the flow through those eductors has an axial as well as a vertical component. In that case, the outlet of the transverse eductors may be drawn through substantially more or less than 90°.

Figure 12:
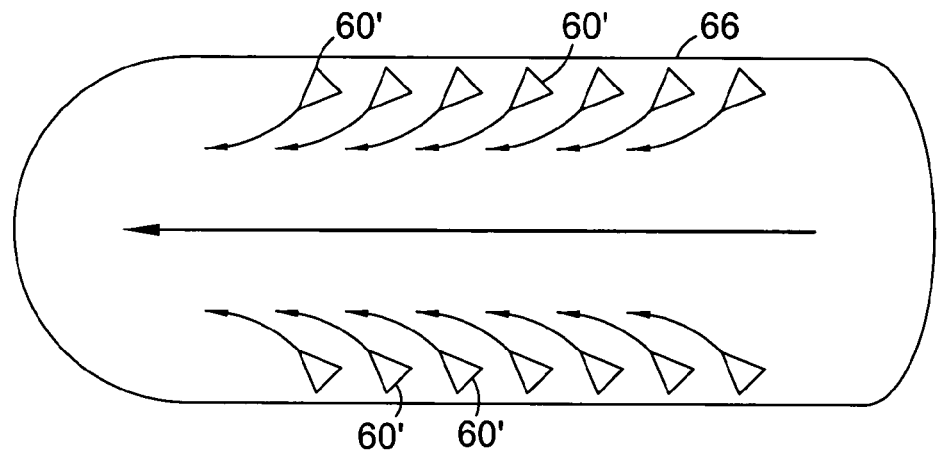
FIG. 12 is a plan view of a process vessel showing a herringbone arrangement of eductors.

In a further embodiment, the eductors 60' are arranged in a herringbone pattern which feeds solids generally towards the middle of the vessel. This is shown in FIG. 12. A typical angle for the herringbone pattern is approximately 45 degrees to the major axis of the vessel 66. A preferred range of angles is 80 to 20 degrees and a more preferred range of angles is 60 to 30 degrees.

The various arrangements described above create a localized high velocity stream along the housing bottom which ideally is sufficient to fluidize only the bottom region of the solids layer and direct it to the solids discharge port 64. If this is achieved, as the fluidized solids are transported away, the solids particles collapse downwards from the layer above into the high velocity jet stream and are themselves fluidized and transported away to the discharge port 64. The effect is that the solids layer is "eaten away" from the bottom of the layer.

As discussed above, it is important at least in separating applications to ensure that there is minimal upward flow of jetting fluid to limit the impact of the jetting procedure on the separation process occurring in the higher regions of the housing 66. In the arrangement described above, the upper, unfluidized solids layer restricts the potential for flow disturbance to occur in the upper regions of the housing.

It is also important to restrict upward movement of the solids back into the main flow moving through the vessel.

Figure 4A:
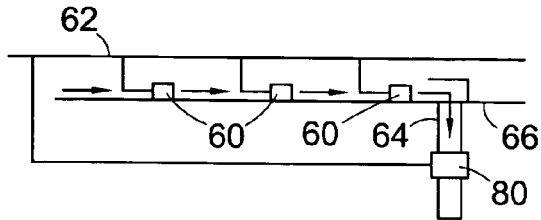
FIG. 4A is an enlarged schematic sectional view of the bottom part of a modified conveyor apparatus.

As a further enhancement, one or more outlet eductor 80 (as shown in FIG. 4A) may be used to draw fluidized solids from the solids outlet 64. The outlet eductor 80 may be supplied with motive fluid from the manifold 62.

Flow through the solids outlet 64 may also be enhanced by one or more generally vertical eductor inside the housing 66 taking the generally horizontal outlet of the preceding axial eductors 60 and directing it downwardly to the solids outlet 64. This may be used as well as or instead of the outlet eductor 80.

It will be appreciated that there are several variations which may be made to the arrangement described above. For example, the process vessel 66 may have more than one solids outlet 64 which may be arranged to receive the output from one or more of the axial eductors 60. Furthermore, one or more of this plurality of outlets 64 may be coupled to one or more outlet eductor 80. Outlet eductors may be located outside the process vessel.

The advantage of having several outlets 64 is that the volume which must be drawn out of the axial eductor daisy-chain by the outlet 64 may be controlled. A single outlet at the end of the daisy-chain will be required to accommodate a greater volume of fluidized solids than several outlets at spaced intervals along the daisy-chain. The use of outlet eductors greatly enhances the performance of the discharge port 64 by actively drawing material out of the port.

Thus, the arrangement described above provides shorter flushing times, a lower jetting water flow rate and reduced impact to process vessel performance when compared to the prior art arrangements. Furthermore, the probability of sediment being carried into the liquid outlet streams of a separating process vessel is reduced. Also, because the flow of solids is generally parallel to the housing wall, erosion damage to the housing is greatly reduced compared to the prior art arrangement.

Traditionally, the removal of solids from the bottom of a process vessel has been carried out periodically. This is at least in part, because of the disruption that the jetting procedure has traditionally caused to the operation of the process vessel. The arrangements described above can also be used periodically in this way. However, the arrangements described above may also be used on a continuous basis. This is particularly advantageous where the volume of solids produced is high and consequently where periodic removal must be carried out at shortly spaced intervals. By continuously operating the conveyor apparatus at low jetting flow rates, removal of solids is achieved with minimum disruption to the operation of the process vessel.

Although only horizontal process vessels have been described, it will be appreciated that the invention is equally applicable to other arrangements, for example, vertical process vessels or separators.

It will also be appreciated that the arrangement described above may be altered for different applications. For example, it may not always be necessary to include the axial eductors 60. Transverse eductors 70 may be used alone in some applications. One such application is in pressurised process vessels. In this application, the transverse eductor 70 operate to move solids to the bottom of the vessel. When the vessel is opened and depressurised, the depressurisation draws the solids out of the vessel.

Also, other means for transporting the solids along the vessel may be used. The key point is to provide baffles which substantially prevent solids moving up into the higher regions of the vessel to prevent re-mixing with other parts of the mix contained in the vessel.

In the context of the present application, the term "process vessel" should be taken to include not only the separators described above but any fluid-containing vessel in which solids may accumulate. A process vessel typically provides "residence time". It may for example be a phase separator, or a holding tank. It also may be a pressurised container.

Figure 8:
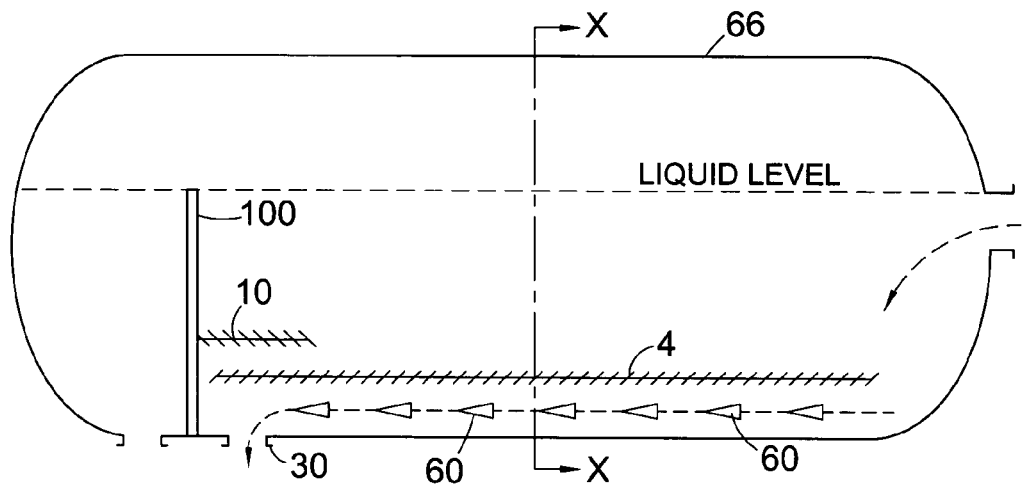
FIG. 8 is a schematic sectional view of a process vessel including a weir plate.

With reference to FIG. 8, the process vessel housing 66 may be provided with one or more weir 100 located on the downstream side of a solids outlet 64. The weir helps to collect sand adjacent the solids outlet 64 and also helps to prevent disturbance of the upper regions of the housing.

Figure 9:
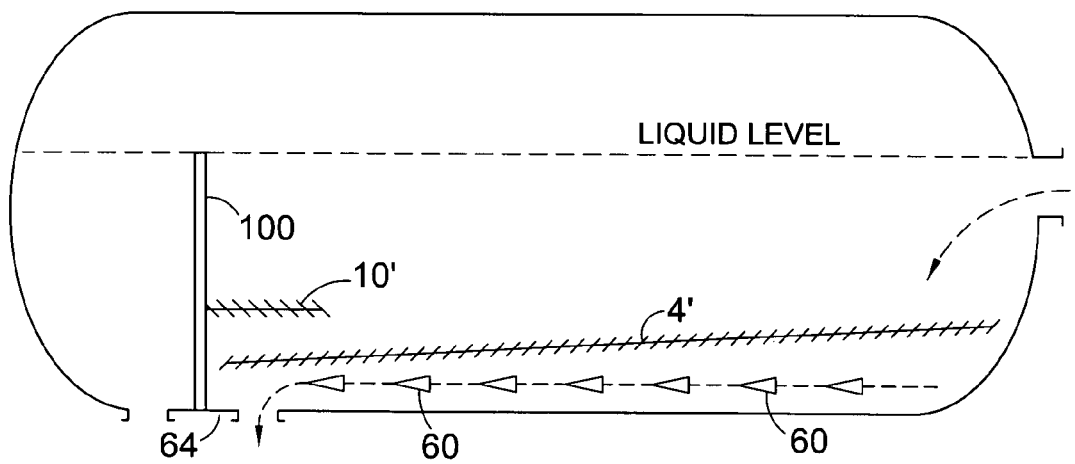
FIG. 9 is a schematic sectional view of a process vessel having inclined guide means.

With reference to FIG. 9, it will be noted that the plates 10' and 4' need not be horizontal. they may, for example, become close or further away from the vessel floor at different positions along the vessel.

Figure 10:
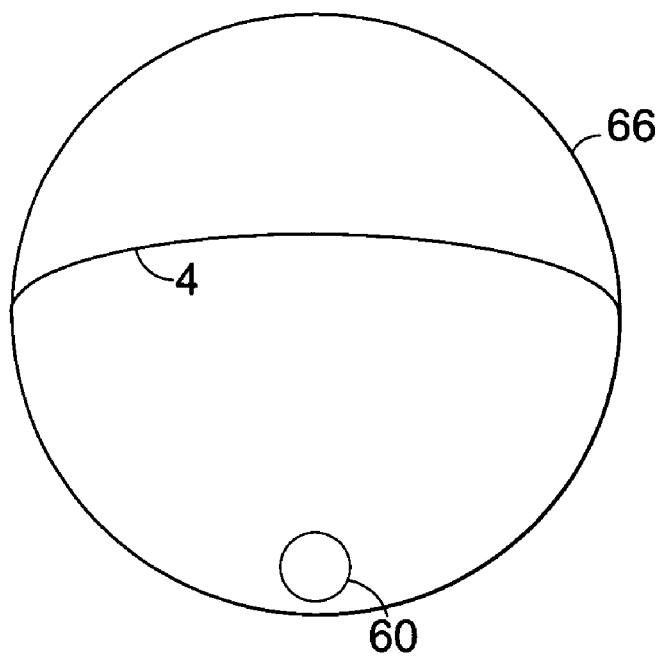
FIG. 10 is a schematic sectional view along line X-X of FIG. 8, of a process vessel showing a curved guide means.
Figure 11:
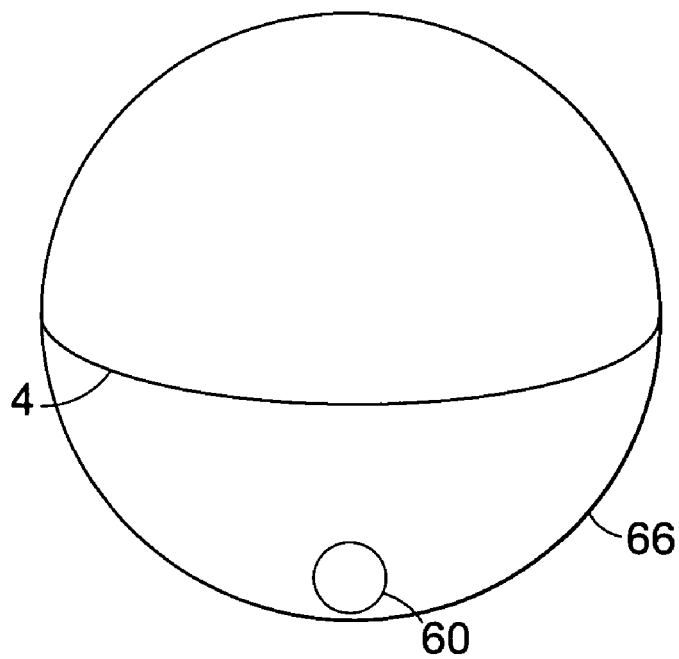
FIG. 11 is a schematic cross sectional view of a process vessel with a curved guide means curved in the opposite direction to FIG. 10.

As a further alternative, FIG. 10 shows an end view of the vessel and shows a curve on the plate 4. With reference also to FIG. 11, it will be seen that the plate may curve in the opposite direction.

It will be appreciated that the plates 10 and 4 and 10' and 4' may be adjustable so that the optimum height, inclination and extensiveness over the vessel may be found.

Performance may be further enhanced by funneling the solids towards the solids outlet. This is shown in FIG. 1 in which inclined funneling baffles 102 located below the first guide means and extending downwardly reduce the effective width of the vessel near the solids outlet 30. As shown in the figure, one possible angle of the inclination is 43 degrees.

Angles in the range 30 to 50 degrees have been found suitable. By angling the baffles 102 in this way, the solids are better directed to the outlet 30.

With reference to FIG. 13, the louvered plate 4 or 10, may be formed from a series of curved baffles 102. The curves on the baffles help to guide sand without causing sudden changes in direction. FIG. 14 shows an alternative configuration in which baffles 104 are curved on only one major surface.

It will be appreciated that the spacing between baffles need not be uniform. It may be desirable to have the spacing closer in some areas and wider in others.

The invention claimed is:

1. A process vessel for separating products from oil or gas wells, comprising:
   a solids outlet, and a plurality of eductors positioned within and generally at a bottom of the vessel and arranged in use to move solids generally along the bottom of the vessel towards the solids outlet, the vessel further including a first guide means located above the eductors and arranged to restrict upward flow of solids.

2. A vessel according to claim 1 wherein the first guide means is generally planar and extends generally horizontally inside the vessel.

3. A vessel according to claim 1 wherein the first guide means is generally planar and is inclined in relation to horizontal.

4. A vessel according to claim 3, wherein an angle of inclination of the first guide means is adjustable.

5. A vessel according to claim 1, wherein a position of the first guide means is adjustable in vertical and/or horizontal directions.

6. A vessel according to claim 1, wherein the first guide means has a curved profile across a direction of bulk fluid flow through the vessel.

7. A vessel according to claim 6, wherein the curved profile causes a generally central portion of the first guide means to be higher than outer portions thereof.

8. A vessel according to claim 6, wherein the curved profile causes a generally central portion of the first guide means to be lower than outer portions thereof.

9. A vessel according to claim 1, wherein the first guide means comprises at least one inclined baffle.

10. A vessel according to claim 9, wherein the at least one baffle is arranged to have an adjustable angle of inclination.

11. A vessel according to claim 9, wherein the at least one baffle has a curved surface.

12. A vessel according to claim 9, wherein the at least one baffle is inclined such that in a direction of bulk fluid flow, said at least one baffle has an upper edge positioned upstream of a lower edge of said at least one baffle.

13. A vessel according to claim 9, wherein the at least one baffle is inclined at an angle between 30 and 50 degrees to horizontal.

14. A vessel according to claim 9, wherein the baffles are inclined at an angle between 35 to 40 degrees to horizontal.

15. A vessel according to claim 1, wherein the first guide means is a perforated sheet.

16. A vessel according to claim 1, wherein the first guide means includes at least one recess spaced periodically and/or randomly.

17. A vessel according to claim 1 including a second guide means located above the first guide means.

18. A vessel according to claim 17, wherein the second guide means is located generally at a downstream end of the first guide means.

19. A vessel according to claim 18, wherein the second guide means has at least a portion of its area located vertically above the first guide means so that the first and second guide means overlap one another.

20. A vessel according to claim 17, wherein the second guide means comprises at least one inclined baffle.

21. A vessel according to claim 20, wherein the at least one baffle is arranged to have an adjustable angle of inclination.

22. A vessel according to claim 20, wherein the at least one baffle has a curved surface.

23. A vessel according to claim 20, wherein the at least one baffle is inclined such that in a direction of bulk fluid flow, said at least one baffle has an upper edge positioned downstream of a lower edge of said at least one baffle and wherein an angle of inclination is adjustable.

24. A vessel according to claim 20, wherein the at least one baffle is inclined at an angle between 30 and 50.

25. A vessel according claim 20, wherein the baffles are inclined at an angle between 35 to 40 degrees to horizontal.

26. A vessel according to claim 17, wherein the second guide means is a perforated sheet.

27. A vessel according to claim 17, wherein the second guide means includes at least one recess spaced periodically and/or randomly.

28. A vessel according to claim 17, wherein the second guide means is generally planar and extends generally horizontally inside the vessel.

29. A vessel according to claim 17 wherein the second guide means is generally planar and is inclined to horizontal.

30. A vessel according to claim 29, wherein the angle of inclination of the second guide means is adjustable.

31. A vessel according to claim 17, wherein the position of the second guide means is adjustable in vertical and/or horizontal directions.

32. A vessel according to claim 17 wherein the second guide means has a curved profile across a direction of bulk fluid flow through the vessel.

33. A vessel according to claim 32, wherein the curved profile causes a generally central portion of the first guide means to be higher than outer portions thereof.

34. A vessel according to claim 32, wherein the curved profile causes a generally central portion of the first guide means to be lower than outer portions thereof.

35. A vessel according to claim 1 wherein the eductors are angled inwardly in a herringbone arrangement so that solids are simultaneously directed downstream and inwardly away from vessel walls of the vessel.

36. A vessel according to claim 1, wherein the eductors are angled inwardly in a herringbone arrangement so that solids are simultaneously directed downstream and inwardly away from vessel walls of the vessel, and wherein an angular position of the eductors is adjustable.

37. A vessel according to claim 1, further including inclined funnelling baffles arranged at a downstream end of the vessel, wherein the baffles are arranged such that an effective width of the vessel is reduced towards the solids outlet in order to funnel solids towards the solids outlet.

38. A vessel according to claim 37, wherein the funnelling baffles extend generally downwardly in the vessel and are located below the first guide means.

39. A vessel according to claim 37, wherein the funnelling baffles act to restrict an effective width of a sand bearing layer located below the first guide means.

40. A vessel according to claim 1 wherein the solids outlet comprises a plurality of solids outlets.

* * * * *